United States Patent [19]

Garner

[11] 4,455,326
[45] Jun. 19, 1984

[54] FLUIDIZED POWER FILLING OF CABLE CORE UNITS

[75] Inventor: John N. Garner, Kingston, Canada

[73] Assignee: Northern Telecom Limited, Montreal, Canada

[21] Appl. No.: 487,739

[22] Filed: Apr. 22, 1983

[51] Int. Cl.³ .......................... B05D 1/24; H01B 3/30
[52] U.S. Cl. .................................. 427/117; 427/120; 427/185; 427/195; 118/420; 118/429; 118/DIG. 5
[58] Field of Search ............... 427/120, 185, 195, 117; 118/420, 429, DIG. 5

[56] References Cited

U.S. PATENT DOCUMENTS

| | | | |
|---|---|---|---|
| 3,097,958 | 7/1963 | Morris | 427/185 |
| 3,254,625 | 6/1966 | Armstrong | 427/185 |
| 3,639,152 | 2/1972 | Bodine | 427/57 |
| 3,817,211 | 6/1974 | Brown | 427/185 |
| 3,958,066 | 5/1976 | Imamura et al. | 427/180 |
| 4,122,212 | 10/1978 | Walling et al. | 427/27 |
| 4,235,024 | 11/1980 | Chauvin | 427/185 |
| 4,273,597 | 6/1981 | Garner et al. | 427/185 |

Primary Examiner—Michael R. Lusignan
Assistant Examiner—Richard Bueker
Attorney, Agent, or Firm—R. J. Austin

[57] ABSTRACT

Method and apparatus for filling a cable core unit with powder in a fluidized bed in which the unit is vibrated laterally by introducing energy pulsations into the bed, the pulses being transmitted as successive waves through the powder particles to transfer the energy to the unit and set up the vibration. In preferred constructions, the pulsations are set up by a reciprocating piston means disposed beneath the upper surface of the powder. There may be two or more piston means spaced in the feed path direction for the unit or a single piston extending.

10 Claims, 5 Drawing Figures

FLUIDIZED POWER FILLING OF CABLE CORE UNITS

This invention relates to the fluidized powder filling of cable core units and is specifically concerned with methods and apparatus for filling cable core units with filling powder.

Cable cores are made either as a single cable core unit or as a plurality of cable core units and each unit comprises a plurality of conductors which are closed or grouped together by stranding.

Conventionally, a grease or jelly is used to fill the voids or interstices between conductors of a cable intended for use underground. Underground cables are provided with water impermeable sheaths to prevent entry of moisture from the ground. Unfortunately, such sheaths are sometimes damaged or cut into and this allows water to seep into the cables. The presence of moisture within a cable has a deleterious effect upon the electrical properties and to prevent this from happening, grease or jelly has been used to fill the voids between conductors thereby having the effect of preventing water access between conductors or to prevent movement of water along the inside of the cable after it has reached the conductors.

As grease or jelly is a messy and uncomfortable material to use and to work with in finished cable, methods of filling the voids with powder have been suggested as an alternative, the powder also acting to prevent or restrict movement of moisture or water along the conductors. Various methods of filling with powder have been suggested. One of the most practical methods is as disclosed in U.S. Pat. No. 4,273,597 entitled "Fluidized Powder Filling of Cable Core Units", granted June 16, 1981, in the name of J. N. Garner. In this method, a cable core unit is passed with its conductors closed together through a fluidized bed of filling powder. The closed together conductors pass through the bed, beneath a defined upper surface of the bed, and minute gaps between the conductors are easily entered by the powder in its fluid state whereby the powder passes into the core and fills all the voids.

In U.S. Pat. No. 4,224,090 granted Sept. 23, 1980 entitled "Powder Filling of Electric Cables with Cable Vibrating Means" in the name of John N. Garner, there is described a method of powder filling a cable core unit by passing the unit through a fluidized bed of filling powder as discussed in the U.S. Pat. No. 4,273,597, and of vibrating the cable core unit in a direction substantially normal to the direction of movement of the unit through the bed. The method covered by U.S. Pat. No. 4,224,090, is concerned with filling the voids of the cable core unit more uniformly with powder. Indeed, as discussed in the patent, in a cable core filled with powder by the vibration technique, the method does in fact provide a cable with improved electrical properties.

A problem exists however, with the method and apparatus described in U.S. Pat. No. 4,224,090 in that the cable core unit is vigorously vibrated mechanically by physical contact with a vibration device through which the core unit needs to pass as it moves through the fluidized bed. If severe contact is made or if insulation around conductors is very thin or weak, this physical contact may, in some cases cause damage to the insulation on the exterior conductors of the core unit which it would be advisable to avoid.

The present invention is concerned with a method and apparatus for providing vibration of a cable core unit as it moves through a fluidized bed during powder filling of the voids between the conductors in which the problem of damage to conductor insulation by contact with the vibration device is avoided.

Accordingly, the present invention provides a method of fluidized powder filling of a cable core unit having a plurality of conductors comprising:

fluidizing a bed of said powder to form a fluidized bed with a defined upper surface;

passing the core unit with its conductors closed together through the fluidized bed and beneath its defined upper surface with the conductors devoid of any surface covering which would prevent powder from moving between the conductors and into the voids of the unit, the fluidized powder in the bed flowing between the conductors to fill the voids within the unit; and vibrating the unit laterally to the direction of its movement as it passes through the bed to move the conductors relative to one another and assist in distribution of the powder by introducing energy pulsations into the powder in at least one location spaced from the core unit, the energy pulses being transmitted as successive waves through the particles of powder to transfer the energy to the unit and set upon the vibration.

In a preferred method, the vibrations are set up by energy pulsations created by a reciprocating piston means which is disposed beneath the upper surface of the powder. Alternatively, the energy pulsations are introduced by movement of a diaphragm within the bed, the diaphragm separating a gas pressurizable chamber from the bed and means is provided for alternating the pressure within the chamber between upper and lower limits so as to flex the diaphragm.

The invention also comprises apparatus for powder filling of voids between closed together conductors of a cable core unit comprising:

a housing having inlet and outlet ends for the unit and side walls extending between the ends, the inlet and outlet ends, respectively, having an inlet and an outlet for the core unit;

a porous member located within the housing and extending cross the housing at a level below the inlet and outlet;

a fluidizable bed of filling powder supported by the porous member and sufficient in quantity to fluidize with a defined upper surface of the bed above the outlet from the housing;

means for causing a gas to flow upwards through the porous member and into and through the powder to fluidize the powder; and an energy pulsing device beneath the defined upper surface of the bed to introduce energy pulsations into the bed for transmittal of energy through the bed in wave form.

In a preferred arrangement, the energy pulsing device comprises a reciprocable piston unit comprising a piston and means to reciprocate the piston. The means to reciprocate the piston preferably comprises an electromagnetic drive means but alternatively can comprise for instance, a mechanical drive means. Conveniently, the electromagnetic drive means comprises an electromagnet surrounding a coil which is held upon the piston rod of the piston to cause reciprocation of the coil and thus the piston. The mechanical drive means may comprise, for instance, a cam shaft drive arrangement which is operably connected to the piston rod.

In the above preferred arrangement of the apparatus, the piston should be sealed to a surround by a flexible sealing member which allows the piston to move relative to the surround while sealing. Suitable polymeric materials such as various grades of polypropylenes or polyethylenes in noncrystalline form or some synthetic rubbers or silicon rubbers are suitable for providing such a sealing member.

With the above method and apparatus according to the invention, there is no contact between the core unit and any vibration device such as could cause damage to the conductor insulation.

Embodiments of the invention will now be described, by way of example, with reference to the accompanying drawings in which.

Figure 1:
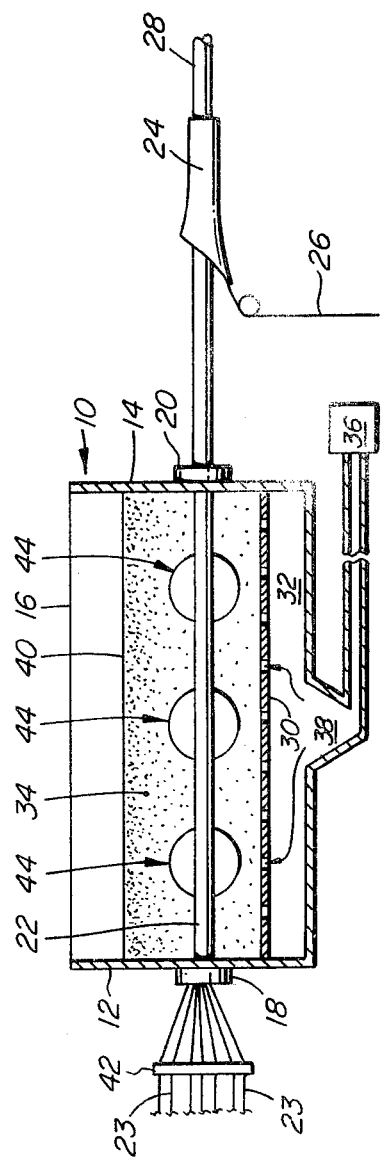
FIG. 1 is an axial cross-sectional view through apparatus according to a first embodiment.
Figure 2:
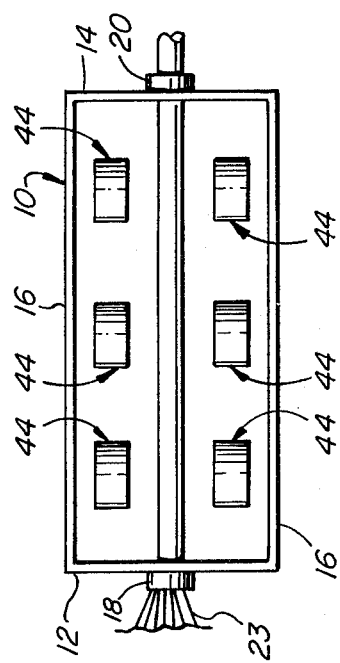
FIG. 2 is a plan view of the apparatus of FIG. 1.

In a first embodiment, as shown by FIGS. 1 and 2, apparatus for the powder filling of voids between conductors of a cable core unit comprises a fluidizable bed housing 10 having an inlet end 12, outlet end 14 and two side walls 16. The end walls 12 and 14 have, respectively, an inlet 18 and an outlet 20 for a core unit 22 composed of a plurality (e.g. 100) of stranded together pairs of telecommunications conductor 23 which have been twisted together in pairs. The conductors are insulated from one another in known manner. The diameter of each of the inlet and outlet orifices is such as to enable the core unit 22 to pass through the orifice with the pairs of conductors closed together, i.e. in their stranded form, to form the unit as shown in FIG. 1.

A conventional wrapping means is disposed immediately adjacent the outlet 20 to wrap a core wrap around the cable core unit upon exiting from the outlet. As shown by FIG. 1, the wrapping means comprises a former 24 through which the cable core unit 22 and core wrapping material 26 is passed. The former has a forming surface (not shown) for the core wrapping material. This surface terminates in a passage for the wrapped core unit 28 and this passage has a diameter substantially equal to that of the orifice at the outlet 20.

The housing 10 has a porous member 30 extending across it between the ends 12 and 14 and between its walls in a lower position in the housing. This member is of conventional design for a fluidized bed apparatus and separates a lower chamber 32 from an upper chamber which carries a quantity of fluidizable powder 34 supported upon the porous member 30. Means for causing a gas to flow upwards through the porous member is provided. This means comprises an air pressurizing means 36 which is connected through an orifice 38 at the bottom of the housing, with the chamber 32 for the passage of air upwards through the porous member and into and through the powder to fluidize the powder in known manner for fluidizable beds. The quantity of powder 34 in the bed is such that upon fluidization, there is defined an upper surface 40 of the bed which lies above the position of the inlet 18 and outlet 20 to the housing 10.

In use, it is intended to pass the core unit 22 through the bed as shown in FIG. 1 with the twisted pairs of conductors closed together in their stranded form. The unit 22 may be stranded by a separate operation before being fed to and through the bed for filling. However, in this embodiment, it is intended to strand the conductors together as they approach the bed. To close the pairs of conductors together, the pairs are passed through a guide 42 upstream of the inlet 18 and then through the inlet at which they converge. The guide 42 is rotatable in known manner for stranding apparatus so as to cause the pairs of filaments to rotate around the center of the guide whereby stranding takes place as the pairs of conductors move through the inlet 18.

As the closed together conductors forming core unit 22, move through the fluidized bed, i.e. beneath the defined upper surface 40, the powder in the bed operates in the manner of a fluid and passes through minute gaps between the conductors so as to flow into and fill the voids between the conductors within the core unit itself. The conductors are devoid of any surface covering which would prevent the powder passing between them. For instance, no oil or grease is used upon the conductor surfaces, whereby the powder is allowed to pass freely between them and does not become trapped upon the conductor surfaces. In addition to this, the conductors are not electrostatically charged before entrance into or during passage through the bed and the use of electrostatic filling methods forms no part of this invention. Hence, as described in the aforementioned U.S. Pat. No. 4,273,597, powder passes between the conductors to fill the voids merely by movement of the powder in a fluid-like manner.

Figure 3:
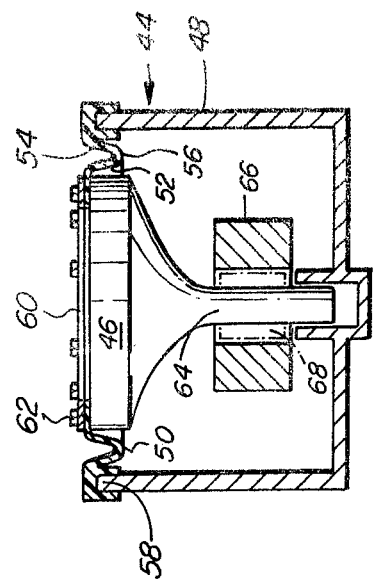
FIG. 3 is a cross-sectional view through energy pulsing device forming part of the apparatus of FIGS. 1 and 2 and shown on a larger scale.

To assist in providing uniformity of fill of powder within the voids, the cable unit 22 is vibrated during its passage through the bed. This vibration is caused by six energy pulsing devices 44 which are disposed, three on each side of the pass line, as shown in FIG. 2, in spaced apart positions along the bed, i.e. beneath the surface 40, and at substantially equal distances away from the passline for the core unit 22. As shown by FIG. 3, each of the energy pulsing devices 44 comprises a reciprocable piston unit in which a piston 46 is movable with a surround 48. Each piston 46 faces outwardly from an opening of the surround 48 towards the passline. Means is provided to seal a space between the piston head and the surround 48. This means comprises a flexible sealing member in the form of an annulus 50 of 'U'-shaped configuration in cross-section, as shown in FIG. 3 and having inner and outer annular legs 52 and 54. Bases of the legs 52 and 54 are secured to the base 56 of the 'U' and their other ends are sealed to the surround 48 and also to the head of the piston 46. To provide sealing engagement with the surround or the piston head, the sealing member 50 may be molded either onto the surround or to the head. As shown in FIG. 3, the sealing member is molded around an annular edge 58 of the surround and is secured by an annular ring 60 and screws 62 to the piston head. The sealing member flexes to allow for reciprocating movement of the piston 46 by axial movement of the leg 52 relative to the leg 54 and by a peeling action at the base of the 'U' into and out of the leg 52.

The piston comprises a piston rod 64 which extends rearwardly through the surround 48. Means is provided for reciprocating the piston. This means is an electromagnetic drive comprising an annular electromagnet 66 around a coil 68 of wire which surrounds and is secured to the piston rod. Reciprocating movement of the coil by the influence of the electromagnet, imparts the same reciprocating movement to the piston through the rod 64.

In use of the devices 44, the pistons 46 are caused to introduce energy pulsations into the fluidized bed at locations spaced away from the core unit. The pulses of energy are transmitted as successive energy waves through the fluidized particles to transfer the energy to the core unit and this causes the core unit to vibrate. This vibration may be in sympathy with the pulses themselves, dependent upon whether the pulse rate matches the natural frequency of the core unit. The rate of reciprocation of the pistons may be varied, for instance, between 200 and 2,000 cycles/minute or greater, dependent upon the construction of the electromagnetic drive. Whether or not the rate of reciprocation corresponds to the natural frequency of the core unit, the core unit is caused to vibrate and this vibration causes minute movements between the conductors thereby assisting the movement of the powder through the unit to provide uniformity in the filling of the voids.

The above process of filling described in the first embodiment, provides vibration to the core unit to assist in filling with powder while avoiding physical contact with the vibration device as described in U.S. Pat. No. 4,224,090. Hence, no damage can be caused to the insulated conductors of the core unit by abrasion or cutting such as could be caused by any physical contact with a vibration device. Therefore, the filling of the voids by the technique described in this specification is not harmful to the insulated conductors.

Figure 4:
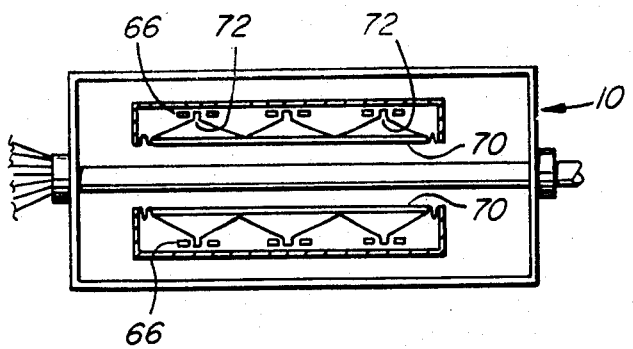
FIG. 4 is a plan view and partly in section of a second embodiment.

In a second embodiment as shown in FIG. 4, the three disassociated pistons on each side of the pass line are replaced by a single elongate piston 70 which extends with its head substantially parallel with the passline within the bed 10. Each elongate piston is provided with a plurality of piston rods 72, e.g. three as shown, each of which is driven by an electromagnetic drive as shown by FIG. 2. With each of the drives operating in unison, the piston is caused to move towards and away from the feedpath while maintaining its parallel position. In the second embodiment, a wave of energy is transmitted as a single wave extending along substantially the whole of the fluidized bed whereby the core unit is vibrated through substantially the whole length of the bed.

Figure 5:
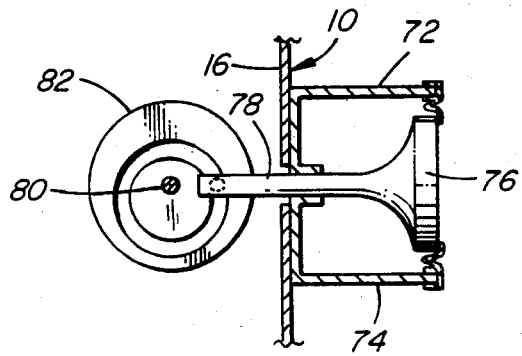
FIG. 5 is a view through the side of a fluidized bed and also through an energy pulsing device in apparatus according to a third embodiment.

In a third embodiment, shown in FIG. 5, in which the electromagnetic drive is not utilized, a housing 10 has six energy pulsing devices 72, one only of which is shown. The devices are positioned similarly to those shown in FIG. 2, except that surrounds 74 for pistons 76 are sealed against the side walls 16 or 18 of the housing. In this arrangement, each piston 76 has a piston rod 78 extending through the wall 16 or 18 to be driven by a mechanical drive means. As shown by this embodiment, the drive means comprises a cam shaft 80 having face cams 82, each of which control the position of a piston 76 while moving it in its reciprocating path.

What is claimed is:

1. A method of fluidized powder filling of a cable core unit having a plurality of conductors comprising:
   fluidizing a bed of said powder to form a fluidized bed with a defined upper surface;
   with the conductors devoid of any surface covering which would prevent flow of powder between the conductors, passing the core unit with its conductors closed together through the fluidized bed and beneath its defined upper surface, the fluidized powder in the bed flowing between the conductors to fill voids within the unit; and
   vibrating the unit laterally to the direction of its movement as it passes through the bed to move the conductors relative to one another and assist distribution of the powder by introducing energy pulsations into the powder by movement of a piston means submerged within the confines of the fluidized bed in at least one location spaced from the cable unit, the energy pulses being transmitted as successive waves through the particles to transfer the energy to the unit and set up the vibration.

2. Apparatus for powder filling of voids between closed together conductors of a cable core unit comprising:
   a housing having inlet and outlet ends for the unit and sidewalls extending between the ends, the inlet and outlet ends, respectively, having an inlet and an outlet for the core unit;
   a porous member located within the housing and extending across the housing at a level below the inlet and outlet;
   a fluidizable bed of filling powder supported by the porous member and sufficient in quantity, upon fluidization, to define an upper surface of the bed above the outlet;
   means for causing a flow of gas upwards through the porous member and into and through the powder to fluidize the powder; and
   an energy pulsing device comprising at least one piston unit positioned within the housing to be submerged within the confines of the bed after its fluidization to introduce energy pulsations into the bed for transmittal of energy through the bed in wave form.

3. Apparatus according to claim 2, wherein the piston unit comprises a reciprocable piston means and means are provided to reciprocate the piston means.

4. Apparatus according to claim 3, wherein the means to reciprocate the piston means comprises an electromagnetic drive.

5. Apparatus according to claim 3, wherein the means to reciprocate the piston means comprises a mechanical drive means.

6. Apparatus according to claim 5, wherein the mechanical drive comprises a cam shaft and cams operably connected to the piston means.

7. Apparatus according to claim 3, wherein the piston means is sealed to a piston surround by a flexible sealing member which flexes during movement of the piston within the surround.

8. Apparatus according to claim 7, wherein the sealing member is molded to the surround or to the piston.

9. Apparatus according to claim 2, wherein there are a plurality of piston units disposed within the housing and spaced apart at each side of the passline for the cable core unit.

10. Apparatus according to claim 2, wherein there are two piston units within the housing, one unit on each side of the passline, each unit comprising a reciprocable piston with a head having a longitudinal axis extending substantially parallel with the passline within the bed, said piston having a plurality of parallel and spaced piston rods and the means to reciprocate the piston means is associated with each of the piston rods.

* * * * *